ELECTRONIC TIMER WITH MAGNETIC CORE COUNTER AND RESET CIRCUIT

Filed March 4, 1966

INVENTOR
EDWARD A. GURTLER
BY Harry M. Saragovitz
Edward J. Kelly, Herbert Berl
& J. Rudolph
ATTORNEYS United States Patent Office 3,518,447

Patented June 30, 1970

3,518,447

ELECTRONIC TIMER WITH MAGNETIC CORE COUNTER AND RESET CIRCUIT

Edward A. Gurtler, Montville, N.J., assignor to the United States of America as represented by the Secretary of the Army Filed Mar. 4, 1966, Ser. No. 534,290
Int. Cl. H03k *25/18, 29/00*
U.S. Cl. 307—88 2 Claims

ABSTRACT OF THE DISCLOSURE

A compact electronic incremental-counter timer with improved and rapid-acting resetting means employing a minimum number of components. A magnetic core, with magnetizing windings thereon, stores an increment of flux for each cycle of a driving source or oscillator. Each cycle is shaped or formed into a pulse, such as a square-wave, and applied through said windings to the core which stores an increment of flux for each pulse until it saturates or goes from positive to negative saturation, and lowers the impedance of the windings from a high to a low value. A storage capacitor in series with the windings and the pulse source is then rapidly charged, and discharges through the circuit in the opposite direction with sufficient current to rapidly reset the core to positive saturation for starting the next cycle. The pulse source impedance or input impedance of the circuit is low in order to allow a fast and complete discharge of the capacitor, and the latter must be able to store enough energy to reset the core to positive saturation for the next cycle.

Figure 1:
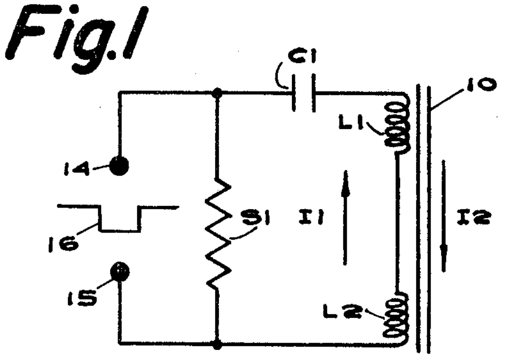

The invention described herein may be manufactured and used by or for the Government for governmental purposes without the payment to me of any royalty thereon.

The present invention relates to electronic timers of the type for use in an environment subject to high degrees of shock acceleration and rotation in operation. Such timers may be used in military equipment such as artillery shells and the like for timing the fuzes thereof. This demands a high degree of accuracy under extremely hazardous and severe operating conditions. The electronic timer therefore, has the advantage over known mechanical timers in that it can be made smaller in size, meet a more rigid shock and spin environment, and maintain its accuracy.

Although work has been done in the field of electronic timers, the timer of the present invention is unique in that its resetting mechanism is of an improved and rapid acting type. More particularly it is of the type known as an incremental counter which uses a magnetic core for storing an increment of flux for each cycle of operation of a driving source or oscillator. One cycle of oscillator operation is shaped or formed into a pulse of predetermined voltage time. This pulse is then applied to the core which stores an increment of flux generated by the voltage time pulse. A capacitive resetting technique is also employed which allows a substantial reduction in the number of components and thereby a reduction in size. There is also a considerable reduction of power consumption due to the capacitive reset. This is important as the cost and size of the power source is reduced.

It is therefore a primary object of this invention to provide an improved electronic timer which can be made relatively small in size and meet a high degree of shock and spin and a high degree of acceleration in moving and rotating carriers such as artillery shells and the like, for example.

It is also an object of this invention to provide an improved electronic timer having a rapid resetting time embodying magnetic core counter and reset circuit means which operates in accordance with capacitive resetting techniques or step-by-step charge and discharge of a series capacitor and a magnetic core inductor of pre-determined construction.

The invention will further be understood from the following description when considered with reference to the accompanying drawing, and its scope is pointed out in the appended claims.

Figure 2:
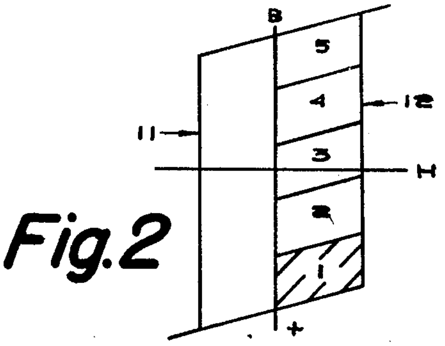
Figure 3:
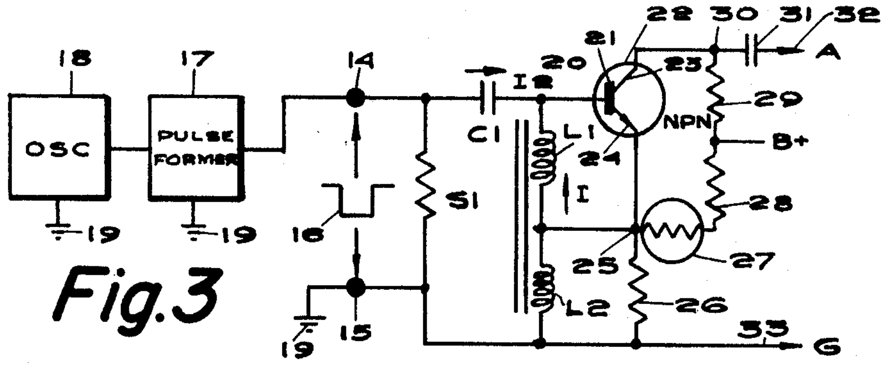
Figure 5:
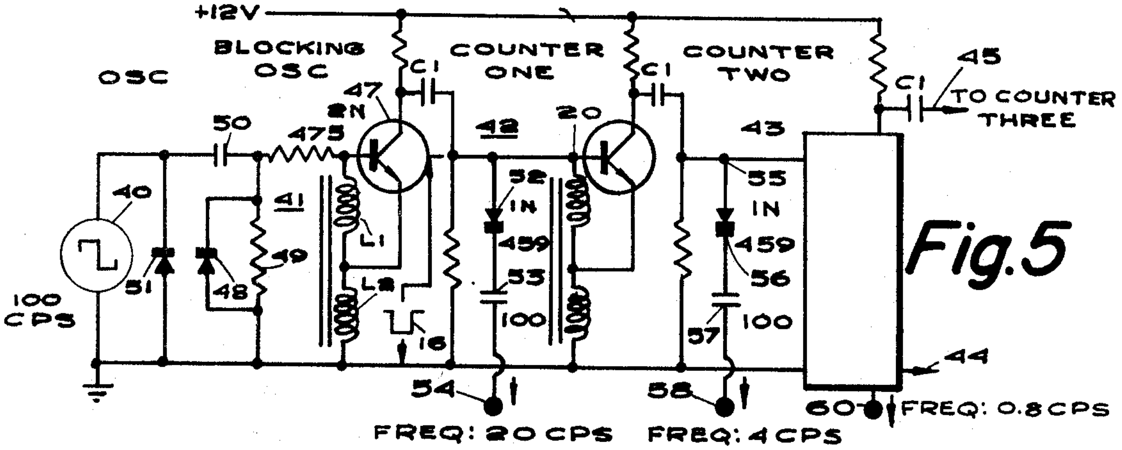
Figure 4:
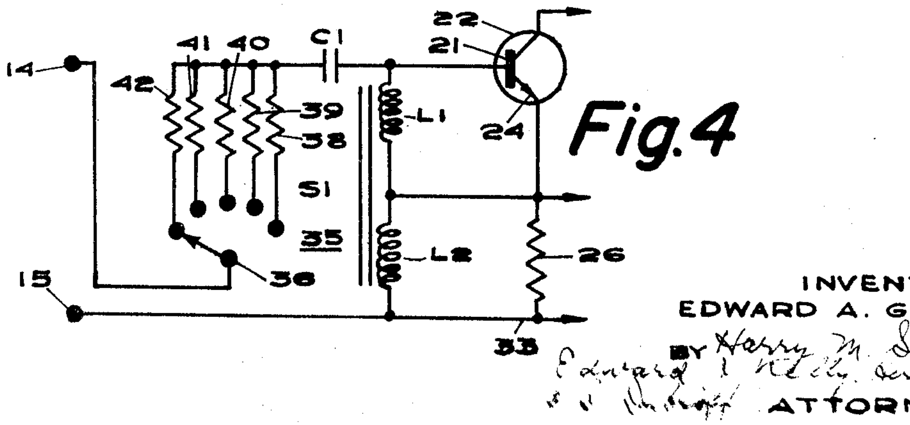

In the drawing:

FIG. 1 is a schematic circuit diagram of a magnetic core counter for an electronic timer in accordance with the invention, FIG. 2 is a graph showing a hysteresis loop characteristic of an inductor used in the circuit of FIG. 1, FIG. 3 is a further schematic circuit diagram of an electronic counter embodying the circuit and apparatus of FIG. 1, in accordance with the invention, FIG. 4 is a schematic circuit diagram showing a portion of the circuit of FIG. 3 and illustrating a modification thereof in accordance with the invention, and FIG. 5 is a final schematic circuit diagram of a complete multiple stage electronic counter showing two of several counter stages provided therein in accordance with the invention.

Referring to the drawing, wherein like reference characters are used to designate like elements throughout the various figures thereof, and referring particularly to FIGS. 1 and 2, two inductive windings as a continuous winding, and designated as L1 and L2, are provided on a magnetic core 10 which is of a material suitable for being driven from negative remanence to positive saturation in incremental steps as indicated for example in FIG. 2 by the curve 11–12 providing a BH loop which is relatively wide, as indicated. The shaded area 1 and the successive areas 2–5 inclusive represent the flux source due to voltage time input pulses as will be described.

The inductive windings L1 and L2 are effectively serially connected and are further serially connected through a capacitor C1 to input terminals 14 and 15 for receiving square wave pulses for operation of the counter circuit. These pulses preferably are negative pulses as indicated at 16, and may be applied from any suitable source such as will be described hereinafter. A low impedance or low resistance resistor S1 is connected in parallel relation across the input circuit at the terminals 14 and 15.

Initially, the core 10 is set to positive remanence, then negative going pulses such as the pulse 16 are applied to the circuit from a low impedance source here established by the resistor S1. The voltage time of the input pulse is adjusted so as to drive the core 10 toward negative saturation incrementally in the five pulses indicated in FIG. 2. Upon application of the first four pulses, the inductive windings L1 and L2 present a high impedance to the applied pulse voltage and therefore the input current indicated at I1 is therefore relatively small. A small amount of charge is stored on the capacitor C1 but charge current I2 is not great enough to disturb the flux stored in the core 10. However, on the fifth pulse the core switches to negative saturation and the input current I1 becomes very large and considerable charge is then stored in the capacitor C1. Now when the capacitor C1 discharges through the low impedance source or resistor S1 the discharge current flow I2 is great enough to reset the core 10 to positive remanence, and ready it for the next pulse.

In practice the incremental counter uses a torroidal magnetic core which stores an increment of flux for each cycle of operation of the driving source which is generally an oscillator. One cycle of oscillator operation is shaped or formed into a pulse of the same voltage time. This pulse is then fed to the core which stores an increment of flux generated by the voltage time pulse as hereinbefore pointed out. This circuit functions in actual practice with the proper selection of the source impedance here represented by the resistor S1 in FIG. 1. It must be low so as to allow a fast and complete discharge of the capacitor C1 and the latter must be able to store enough energy to reset the core 10.

In order to develop a waveform to drive another stage of count, the circuit of FIG. 3 is provided and incorporates the magnetic core counter of FIG. 1 designated by like reference characters. The square-wave negative operating pulses for timing, as indicated at 16, are applied to the input terminals 14 and 15 from a suitable operating source such as a pulse forming network 17 supplied in turn by a square wave oscillator 18 connected therewith. This is a common ground circuit having ground returns as indicated at 19.

On the output side of the magnetic counter circuit having high potential terminal connected with the inductor L1 a connection is made to the base 21 of a transistor device 22 of the switching type having a collector element 23 and an emitter element 24. The emitter 24 or emitter element is connected to a terminal 25 in common with two resistors 26 and 27 and the midtap between the inductors L1 and L2. The resistor 26 is the emitter biasing resistor and is connected to a common ground return circuit lead 33. The resistor 27 is a voltage control resistor connected through a second series voltage dropping resistor 28 to the supply lead. The circuit is completed by a collector electrode coupling resistor 29 connected between the B-plus supply lead and a terminal 30 as the output terminal on the collector circuit and this in turn is coupled through a capacitor 31 to an output circuit lead 32 for which the low potential output lead is 33. The high and low potential output connections are further designated by the reference characters A and G respectively.

Temperature changes generally have an adverse effect upon any counter and particularly on an electronic counter above 120° F. High tempeartures tend to increase the rate of conduction of the transistor 22 in the present example and causes the counter output pulse to change. This problem has been eliminated in the circuit of FIG. 3 by connecting the resistor 27 as a thermistor which decreases in resistance value as the temperature rises. The voltage drop across the resistor 26 thus increases and back biases the emitter 24 of the transistor 22. This counteracts the increase in conduction due to temperature rise. This circuit has been found to operate successfully over a relatively wide temperature range, for example, from 70° F. to over 105° F.

The operation of this circuit of FIG. 3 is dependent upon the supply of square-wave pulses 16 from the source 18 and may be of the order of 100 cycles/second as a basis for later division of the frequency down to relatively low levels. Once the reset charge I2 flows from the capacitor C1, a positive voltage appears on the base 21 of the transistor 22 causing the transistor to conduct current through the collector circuit. This causes the lead 32 or output terminal A to go negative, the width of this negative pulse being controlled by the R/C time constant of the capacitor C1 and the resistor or impedance S1 in the magnetic core counter circuit. The negative pulse is a sharp fall and rise time negative square pulse due to the fast switching characteristics of the transistor 22 and is capacitively conducted through the capacitor 31 to the next stage of count.

The number of counts per stage of counters may be varied by varying the resistance of the element S1. This is done by limiting the drive current from the oscillator and pulse former to the counter through series resistors which replace the resistor S1 as shown, for example, in FIG. 4 to which attention is directed along with FIG. 3.

Here the same magnetic core counter circuit is provided as in FIG. 3 and the only modification is in the input circuit between the terminals 14 and 15. The terminal 14 is connected to the selector arm or contact 36 of a selector switch 35 each of the five points of which are connected with a separate series resistor element 38–42 inclusive of different resistance values effective to vary the count from 1 to 5 for example. If six stages of five counts are operating or dividing from a 100 cycle oscillator, the time then can be varied from 10 milliseconds to 150 seconds by this means. It is felt that this technique of varying time is adaptable to dial type military elements or the like, such as fuzes, where the switches may be mechanically set to give the proper initiation time.

Referring now to FIG. 5 the combination of a number of counter stages into a system is shown therein and include an oscillator 40 as the square-wave source of signal of 100 cycles per second, for example, connected to a blocking oscillator 41 which serves as a pulse former for forming the square-wave negative pulse 16 at the input side of the present converter stage or counter one at 42. This latter stage is, in turn, coupled to a successive seating stage of Counter Two as indicated at 43 and through output leads 44 and 45 to succeeding counter stages such as Counter Three. As many as five stages have been provided in a system of this type.

The blocking oscillator portion of the system includes the same inductors L1 and L2 connected with a transistor 47 as previously described, with a control rectifier 48 and shock resistor 49 in the base or input circuit. The latter is capacitively coupled through a capacitor 50 with the square-wave oscillator 40 and this is provided with a shock rectifier 51 for deriving therefrom only the negative pulses as is understood.

The first frequency signal output is taken from the first counter in connection with the high potential terminal 20 through a rectifier 52 and a coupling capacitor 53 to an output terminal 54 which provides 20 cycles per second output from a 100 cycle per second input. A similar output connection in the second stage at 55, through a rectifier 56 and coupling capacitor 57 to an output terminal 58 provides a frequency output of 4 cycles per second. In a similar manner the output from the counter stage 3 would be .8 cycle per second at the terminal 60 as indicated.

From the foregoing description it will be seen that in all of the circuits of the counter stages a magnetic core counter of the type shown in FIG. 1 is provided and coupled to a type of transistor adapted for switching off and on in response to pulse operation. Furthermore it will be seen that initially the core in each case is set to positive remanence and then negative going pulses are fed to the circuit from a low source impedance and the voltage time of the input pulse is adjusted so as to drive the core towards negative saturation incrementally in five pulses. Upon application of the first four pulses the impedance of the inductors L1 and L2 changes from high impedance to relatively low impedance and the circulating current I1 increases rapidly to charge the capacitor C1 to full charge. On the fifth pulse the core switches to negative saturation and I2 becomes very large. The capacitor C1 then discharges through the resistor network provided in the input circuit with a current I2 which is great enough to reset the core to positive remanence. Thus the resetting is automatic at the end of each count of five in the present example.

The use of an incremental counter using a magnetic core element which stores an increment of flux for each cycle of operation from a driving oscillator is combined with means for shaping one cycle of oscillator operation into a pulse and then applying this pulse to the magnetic core. The core stores each increment of flux generated by the voltage-time pulse until the capacitor in the circuit is charged and the inductor element in series therewith changes from high impedance to low impedance or from positive remanence to negative remanence. If it takes ten pulses to drive the core from negative remanence to positive saturation then the oscillator frequency will be divided by ten and this technique is applied throughout the system as has been seen.

I claim:

1. An electronic timer comprising in combination, a magnetic core counter including a pair of series-connected inductor elements and a common core therefor together with a series capacitor and resistor element of relatively low impedance value providing a series circuit connection, means for applying input signal pulses across said low impedance resistor of the square-wave negative type, at a relatively low frequency, said capacitor and resistor element having a resistance-capacitance time constant for driving said inductors from a high impedance condition with the core at negative remanence to a low impedance condition with the core at a positive remanence in a series of counting pulses which causes the core to go to saturation whereby the capacitor discharges through the inductors to restore the core saturation to negative remanence for a new cycle of operation, and wherein a transistor signal output coupling element is provided in a common emitter circuit connected with a base and emitter thereof in parallel relation with a first of said inductors and an emitter resistor connected in parallel with the second of said inductors, and wherein a collector output circuit including a series coupling resistor is provided for said transistor and a bias current supply connection including a controlling thermistor is provided for said emitter resistor.

2. In an electronic timer, a magnetic core counter circuit comprising in combination, a pair of series-connected inductors having a common core adapted for saturation in response to a plurality of negative or positive signal pulses applied thereto, a low impedance pulse source coupled to said series-connected inductors through a series capacitor adapted for receiving incremental charges from input signal pulses applied thereto from said low impedance source, said series connected capacitor and input circuit having a resistance-capacitance time constant adapted for applying incremental pulses to said series-connected inductors to saturate the core thereof in a predetermined number of pulses and drive said core from negative remanence to saturation and low impedance through said inductors, thereby to discharge said capacitor and effect the restoration of the core element to negative remanence, means for coupling an output circuit to said inductor, means for applying input square-wave signals at a relatively low frequency to said inductor through said capacitor from said low-impedance source, and wherein the low-impedance source includes an adjustable resistor element having a plurality of steps corresponding to the number of steps into which the frequency of the input oscillations are to be divided for effecting a control of the charging current to said capacitor, and wherein the means for coupling an output circuit to the inductor includes a transistor having a collector circuit output connection and base and emitter connections across one of said inductors.

References Cited

UNITED STATES PATENTS

| | | | |
|---|---|---|---|
| 2,962,700 | 11/1960 | Horsch | 340—174 |
| 2,897,380 | 7/1959 | Neitzert | 307—106 |

TERRELL W. FEARS, Primary Examiner

K. E. KROSIN, Assistant Examiner

U.S. Cl. X.R.

307—106, 220; 340—174